(12) United States Patent
Kunieda et al.

(10) Patent No.: US 11,785,164 B2
(45) Date of Patent: Oct. 10, 2023

(54) IMAGE PROCESSING APPARATUS, METHOD AND PRODUCT THAT REINFORCES A PORTION OF A PREDETERMINED PATTERN DETECTED FROM A SCANNED IMAGE AT WHICH INTENSITY HAS BECOME LOW

(71) Applicant: Canon Kabushiki Kaisha, Tokyo (JP)

(72) Inventors: Hiroyasu Kunieda, Kanagawa (JP); Akitoshi Yamada, Kanagawa (JP); Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,002

(22) Filed: Feb. 16, 2022

(65) Prior Publication Data

US 2022/0263965 A1    Aug. 18, 2022

(30) Foreign Application Priority Data

Feb. 18, 2021   (JP) ................. 2021-024396

(51) Int. Cl.
*H04N 1/32* (2006.01)
*H04N 1/00* (2006.01)
*H04N 1/387* (2006.01)
*G06K 19/06* (2006.01)

(52) U.S. Cl.
CPC ... *H04N 1/32208* (2013.01); *G06K 19/06037* (2013.01); *H04N 1/0087* (2013.01); *H04N 1/00204* (2013.01); *H04N 1/00323* (2013.01); *H04N 1/00846* (2013.01); *H04N 1/00867* (2013.01); *H04N 1/00883* (2013.01); *H04N 1/32144* (2013.01); *H04N 1/3872* (2013.01); *H04N 1/00859* (2013.01); *H04N 2201/327* (2013.01)

(58) Field of Classification Search
None
See application file for complete search history.

(56) References Cited

U.S. PATENT DOCUMENTS

| 8,303,075 B2 * | 11/2012 | Ito ............................. G06K 7/14 |
| | | 347/19 |
| 8,363,883 B2 | 1/2013 | Kunieda |
| 8,542,867 B2 * | 9/2013 | Sato ................... H04N 1/32149 |
| | | 235/462.01 |

(Continued)

FOREIGN PATENT DOCUMENTS

| EP | 676877 A2 * | 10/1995 | ........... H04L 9/3247 |
| JP | 2006-270972 A | 10/2006 | |

(Continued)

OTHER PUBLICATIONS

Co-pending U.S. Appl. No. 17/672,993, filed Feb. 16, 2022.

*Primary Examiner* — Scott A Rogers
(74) *Attorney, Agent, or Firm* — Venable LLP

(57) ABSTRACT

An object is to provide a copy function that guarantees intensity of embedded information. At the time of copying a printed material, embedded information is extracted from a scanned image obtained by scanning the target printed material. Then, in a case where it is confirmed that the copy-target printed material is an authentic document by the extracted embedded information, the embedded information extracted from the scanned image is reconfigured and printed and output.

10 Claims, 12 Drawing Sheets

(56) References Cited

U.S. PATENT DOCUMENTS

| | | | | |
|---|---|---|---|---|
| 8,564,825 B2* | 10/2013 | Imamura | ............ | H04N 1/32133 |
| | | | | 235/494 |
| 8,595,503 B2* | 11/2013 | Ming | ................ | H04N 1/32283 |
| | | | | 713/176 |
| 10,855,868 B1* | 12/2020 | Wushour | .............. | G06F 16/164 |
| 10,893,162 B2 | 1/2021 | Saitoh | | |
| 11,157,639 B2* | 10/2021 | Wushour | ............ | G06F 21/6209 |
| 2022/0263964 A1* | 8/2022 | Yamada | ............. | H04N 1/00846 |
| 2023/0136221 A1* | 5/2023 | Yamada | ............... | H04N 1/6086 |
| | | | | 358/1.1 |
| 2023/0136501 A1* | 5/2023 | Yamada | ................. | H04N 1/407 |
| | | | | 358/1.9 |
| 2023/0139830 A1* | 5/2023 | Kunieda | ............ | H04N 1/00846 |
| | | | | 358/475 |

FOREIGN PATENT DOCUMENTS

| | | | |
|---|---|---|---|
| JP | 2008017271 A | * | 1/2008 |
| JP | 2020-088780 A | | 6/2020 |
| WO | 02/31752 | | 4/2002 |

* cited by examiner

| 0 | 0 | 0 | 0 | 0 | 0 | 0 | -10 |
|---|---|---|---|---|---|---|---|
| 0 | 0 | 0 | 0 | 0 | 0 | -10 | 0 |
| 0 | 0 | 0 | 0 | 0 | -10 | 0 | 0 |
| 0 | 0 | 0 | 0 | -10 | 0 | 0 | 0 |
| 0 | 0 | 0 | -10 | 0 | 0 | 0 | 0 |
| 0 | 0 | -10 | 0 | 0 | 0 | 0 | 0 |
| 0 | -10 | 0 | 0 | 0 | 0 | 0 | 0 |
| -10 | 0 | 0 | 0 | 0 | 0 | 0 | 0 |

MASK FOR GENERATING PATTERN INDICATING 0

FIG.4A

| -10 | 0 | 0 | 0 | 0 | 0 | 0 | 0 |
|---|---|---|---|---|---|---|---|
| 0 | -10 | 0 | 0 | 0 | 0 | 0 | 0 |
| 0 | 0 | -10 | 0 | 0 | 0 | 0 | 0 |
| 0 | 0 | 0 | -10 | 0 | 0 | 0 | 0 |
| 0 | 0 | 0 | 0 | -10 | 0 | 0 | 0 |
| 0 | 0 | 0 | 0 | 0 | -10 | 0 | 0 |
| 0 | 0 | 0 | 0 | 0 | 0 | -10 | 0 |
| 0 | 0 | 0 | 0 | 0 | 0 | 0 | -10 |

MASK FOR GENERATING PATTERN INDICATING 1

FIG.4B

PATTERN REPRESENTING 0

PATTERN REPRESENTING 1

| -10 | 0   | 0   | +10 | +10 | 0   | 0   | -10 |
|-----|-----|-----|-----|-----|-----|-----|-----|
| 0   | 0   | +10 | +10 | 0   | 0   | -10 | -10 |
| 0   | +10 | +10 | 0   | 0   | -10 | -10 | 0   |
| +10 | +10 | 0   | 0   | -10 | -10 | 0   | 0   |
| +10 | 0   | 0   | -10 | -10 | 0   | 0   | +10 |
| 0   | 0   | -10 | -10 | 0   | 0   | +10 | +10 |
| 0   | -10 | -10 | 0   | 0   | +10 | +10 | 0   |
| -10 | -10 | 0   | 0   | +10 | +10 | 0   | 0   |

MASK FOR GENERATING VARIATION INDICATING 0

FIG.6A

| -10 | 0   | 0   | +10 | +10 | 0   | 0   | -10 |
|-----|-----|-----|-----|-----|-----|-----|-----|
| -10 | -10 | 0   | 0   | +10 | +10 | 0   | 0   |
| 0   | -10 | -10 | 0   | 0   | +10 | +10 | 0   |
| 0   | 0   | -10 | -10 | 0   | 0   | +10 | +10 |
| +10 | 0   | 0   | -10 | -10 | 0   | 0   | +10 |
| +10 | +10 | 0   | 0   | -10 | -10 | 0   | 0   |
| 0   | +10 | +10 | 0   | 0   | -10 | -10 | 0   |
| 0   | 0   | +10 | +10 | 0   | 0   | -10 | -10 |

MASK FOR GENERATING VARIATION INDICATING 1

FIG.6B

PATTERN REPRESENTING 0

PATTERN REPRESENTING 1

EXTRACTED PATTERN

PATTERN REINFORCEMENT MASK

EMBEDDED PATTERN

EMBEDDED PRINT PATTERN

IMAGE PROCESSING APPARATUS, METHOD AND PRODUCT THAT REINFORCES A PORTION OF A PREDETERMINED PATTERN DETECTED FROM A SCANNED IMAGE AT WHICH INTENSITY HAS BECOME LOW

BACKGROUND OF THE INVENTION

Field of the Invention

The technique of the present disclosure relates to a technique to copy a printed material.

Description of the Related Art

Conventionally, in the society in Japan and each country, a paper document has been handled as a formal authentic original document. However, with the development of the advanced information communications society, the legal adjustment (electronic signature method), the reform of system, and the relaxation of regulations have been prompted so that an electronic document can be handled as an authentic original document and the technique to utilize/store an electronic document as an authentic original document has also been implemented. In the social background such as this, at present, an electronic document is handled as an authentic original document and it has become not uncommon that a printed material on which it is printed is handled as its copy (for example, a copy of certificate of residence). Then, in the printed material such as this, information is embedded in an aspect in which the information is unlikely to be visually recognized. For example, Japanese Patent Laid-Open No. 2020-088780 has disclosed a technique to detect falsification for a printed material by embedding digital watermark data in the printed material.

At the time of copying a printed material of an authentic original document for which embedment of information has been performed by a copy machine, there is a case where it is not possible to appropriately reproduce the embedded information in the printed material (copied material of the authentic original document) that is output. Originally, embedment of information in a printed material is implemented by forming a predetermined pattern on a sheet with a density that the human eyes are unlikely to recognize. Here, for example, in a case where a predetermined pattern is not formed with a sufficient intensity at the point in time at which an authentic original document is printed, it is not possible to appropriately read the predetermined pattern representing the embedded information at the time of reading the printed material of the authentic original document. Further, because of the limit of the performance of a scanner device, there is a case where it is not possible to appropriately read a predetermined pattern representing embedded information. As described above, in a case where deterioration of the intensity of the information embedded in the printed material of the authentic original document has occurred, the embedded information in the copied material thereof will also be deteriorated.

The image processing apparatus according to the present disclosure is an image processing apparatus having a copy function and including: a memory that stores a program; and a processor that executes the program to perform: obtaining a scanned image by scanning a copy-target printed material; extracting embedded information from the scanned image; generating an image to be printed based on the scanned image; and performing print processing using the image to be printed, wherein in the generating, in a case where it is confirmed that the copy-target printed material is an authentic document by the extracted embedded information, the image to be printed is generated by reconfiguring embedded information extracted from the scanned image.

Further features of the present disclosure will become apparent from the following description of exemplary embodiments with reference to the attached drawings.

BRIEF DESCRIPTION OF THE DRAWINGS

FIG. 4A and FIG. 4B are each a diagram showing an example of a mask:

FIG. 6A and FIG. 6B are each a diagram showing an example of a mask;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In the present specification, it is assumed that an "authentic origin document" means an electronic document (digital document) that is registered/managed along with information indicating that the contents thereof are authentic and a "printed material of an authentic original document" means a printed material that is printed by using data of the electronic document. Consequently, an official document, for example, such as the "copy of certificate of residence" described previously, which is issued by a public office, corresponds to the "printed material of an authentic original document". Further, it is assumed that a "copied material of an authentic original document" means a printed material obtained by copying the "printed material of an authentic original document" by an image processing apparatus equipped with a copy function. Consequently, what is obtained by copying, for example, the above-described "copy of certificate of residence" corresponds to the "copied material of an authentic original document".

First Embodiment

<System Configuration>

Figure 1:
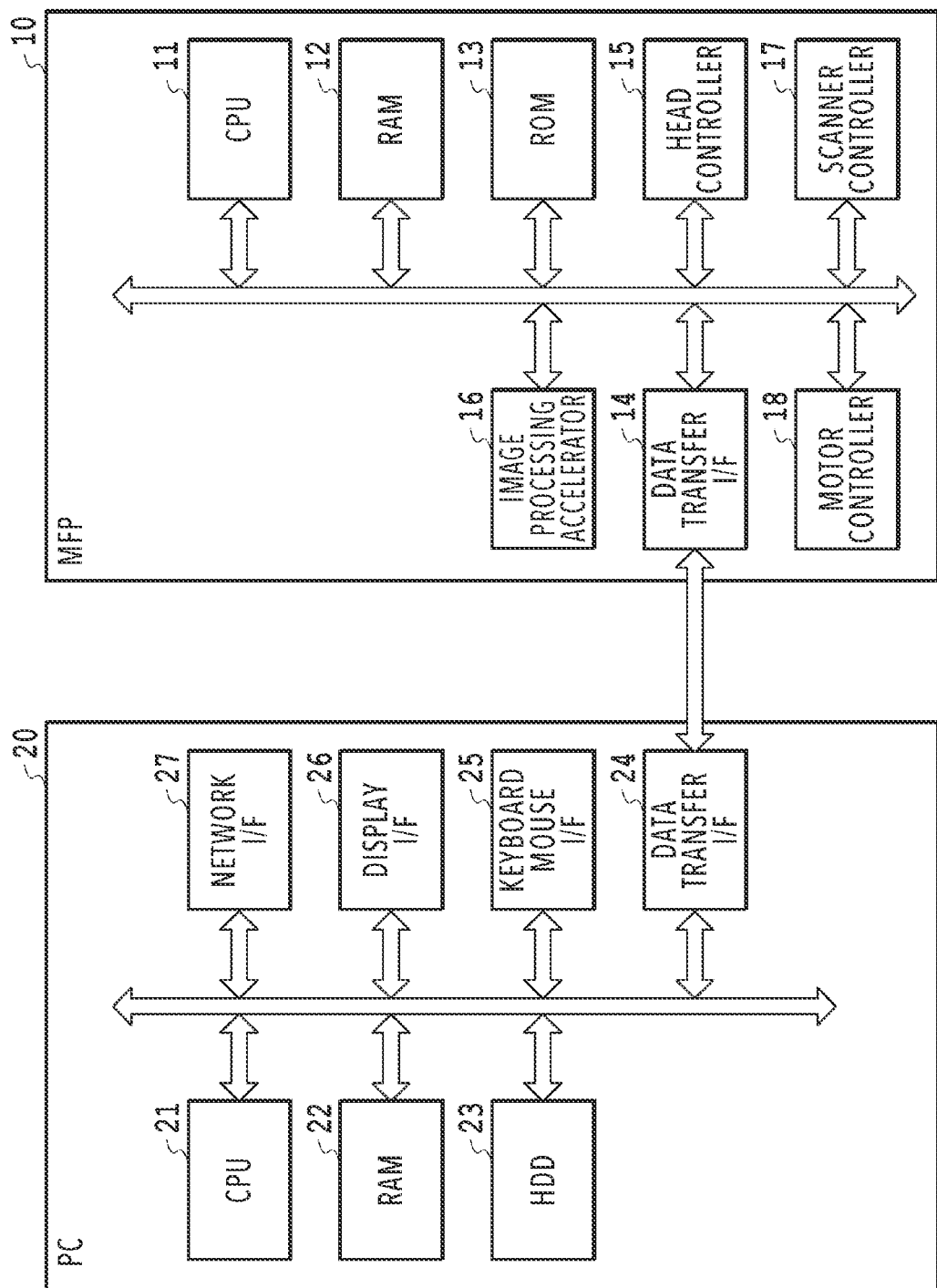
FIG. 1 is a block diagram showing a configuration of a printing system.
Figure 10:
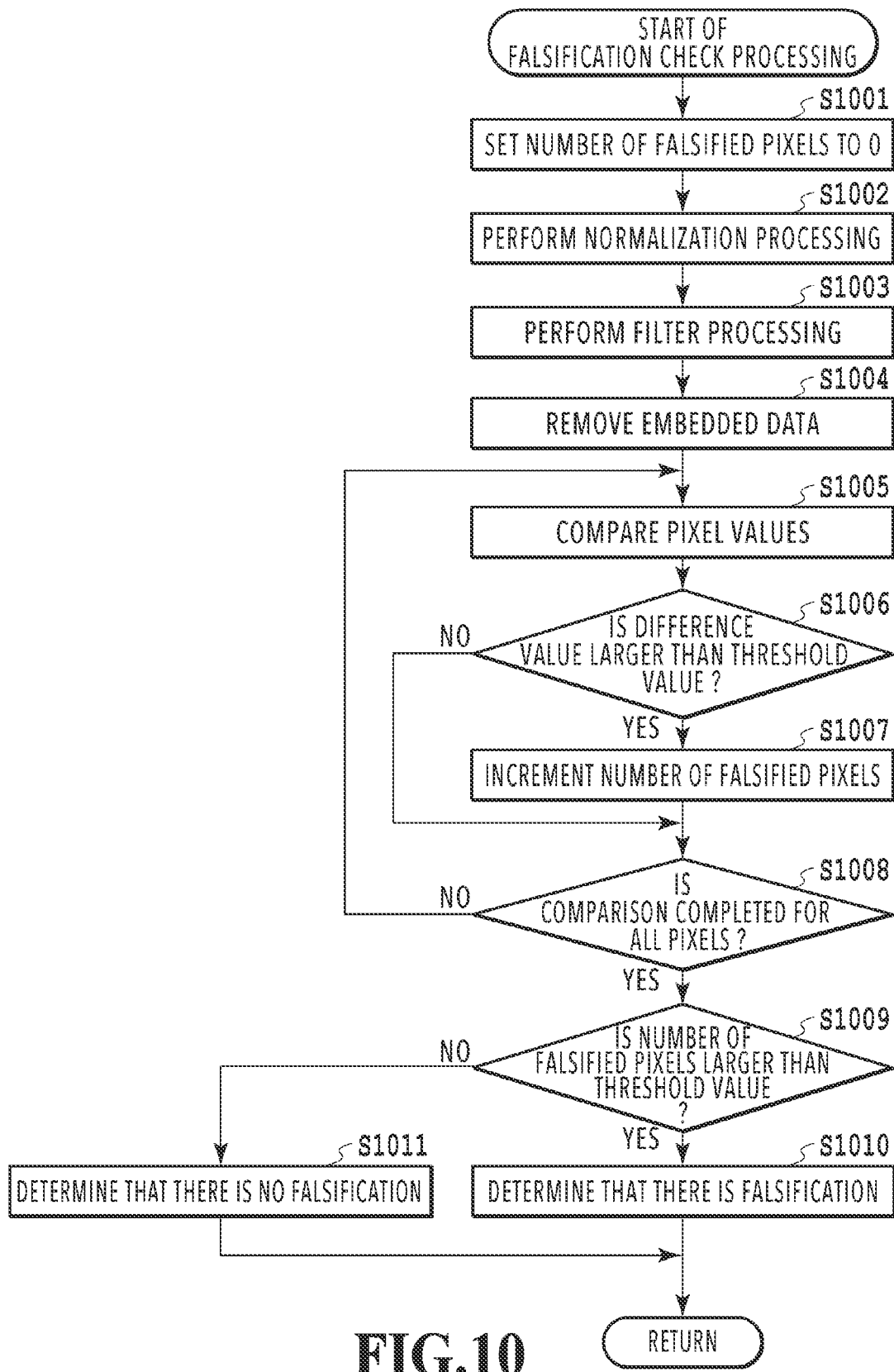
FIG. 10 is a flowchart showing details of falsification check processing.

FIG. 1 is a block diagram showing the configuration of a printing system according to the present embodiment. As shown in FIG. 10, this printing system has an MFP (Multi Function Printer) 10 as a printing apparatus and a PC 20 as a host apparatus thereof. The MFP 10 has a plurality of functions, such as the function as a printer and the function as a scanner, and also has the copy function that performs both the functions in conjunction with each other. It may also be possible for the MFP 10 further to have the function to store/transmit printing-target image data and the function to transmit and receive a FAX. In the following, the hardware configuration of each of the MFP 10 and the PC 20 is explained.

The MFP main body 10 mainly includes the following elements. A CPU 11 is a central processing unit that centralizedly controls the entire MFP 10 and performs, for example, copy processing and the like, to be described later, in accordance with programs stored in a ROM 13 or a RAM 12. The RAM 12 is a volatile storage and temporarily stores programs and data. Further, the ROM 13 is a nonvolatile storage and stores table data and programs, which are used in various kinds of processing, to be described later. A DATA TRANSFER I/F 14 controls transmission and reception of data with the PC 20. A HEAD Controller 15 controls the heating operation of a heater mounted on a print head, not shown schematically, based on print data and ejects ink. An Image Processing Accelerator 16 is a central processing unit capable of performing image processing faster than the CPU 11. The Image Processing Accelerator 16 is not necessarily required and it may also be possible to perform creation processing of the above-described table parameters and the image processing only by the processing by the CPU 11 in accordance with the specifications of the printer and the like. A SCANNER Controller 17 performs light emission control of an LED mounted on a scanner unit, not shown schematically, obtaining of light quantity information from the scanner unit, write control to the RAM 12, and so on. Due to this, an image of a document set on a document table, not shown schematically, is read. A MOTOR Controller 18 controls a plurality of motor units, not shown schematically, and moves the print head relative to a printing medium, moves the scanner unit relative to a document, and so on. The configuration of the MFP 10 is not limited to that shown schematically and for example, the configuration may comprise a network interface that connects to an external network and performs communication with another external PC and the like.

The PC 20 mainly includes the following elements. A CPU 21 is a central processing unit that centralizedly controls the entire PC 20 and performs, for example, print processing of an authentic original document, to be described later, in accordance with programs stored in an HDD 23 or a RAM 22. The RAM 22 is a volatile storage and temporarily stores programs and data. Further, the HDD 23 is a nonvolatile storage and similarly stores programs and data. A DATA TRANSFER I/F 24 controls transmission and reception of data with the MFP 10. As the connection method of the data transmission and reception, it is possible to use wired connection, such as USB, IEEE 1394, and LAN, and wireless connection, such as Bluetooth and WiFi. A KEYBOARD MOUSE I/F 25 is an interface that controls an HID (Human Interface Device), such as a keyboard and a mouse. A DISPLAY I/F 26 performs display control in a display, not shown schematically. A NETWORK I/F 27 connects the PC to an external network and performs communication with a single external PC or a plurality of external PCs, and makes a request for collation of a document ID, a request for results, a request for document data, and the like.

<Print Processing of Authentic Original Document>

Figure 2:
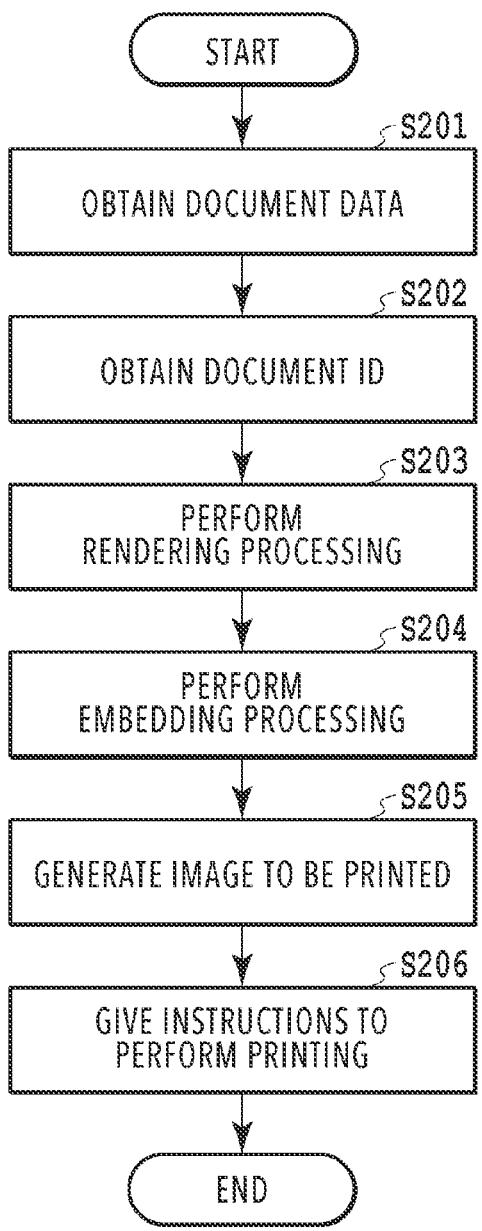
FIG. 2 is a flowchart showing a flow in a case where an electronic document of an authentic original document is printed.

Following above, a flow in a case where an electronic document, which is an authentic original document, is printed is explained with reference to the flowchart in FIG. 2. The series of processing shown in the flowchart in FIG. 2 is started by a user selecting an electronic document that is a printing target and giving instructions to perform printing accompanied by embedment of information indicating authenticity thereof via a UI of a predetermined printing application installed in the PC 20. In the following explanation, symbol "S" means a step.

At S201, data of an electronic document designated as a printing target is obtained. In the present embodiment, electronic documents of various authentic original documents are stored/managed by an external PC, not shown schematically. The PC 20 transmits a request to obtain a specific electronic document to the external PC via the NETWORK I/F 27 and receives and obtains data for printing a designated electronic document, specifically, PDL data from the external PC. Here, PDL is the abbreviation of Page Description Language and consists of a set of drawing commands for each page. The kinds of drawing command are defined for each PDL specification and in the present embodiment, the following there kinds are used as an example.

TEXT drawing command: (X1, Y1, color, font information, character string information)

BOX drawing command: (X1, Y1, X2, Y2, color, fill pattern)

IMAGE drawing command: (X1, Y1, X2, Y2, image file information)

In addition to the above-described three kinds, the DOT drawing command to draw a dot, the LINE drawing command to draw a line, the CIRCLE drawing command to draw a circular arc, and the like exist and these drawing commands are used in accordance with use. In general, as PDL that is used frequently, PDF (Portable Document Format) proposed by Adobe Inc., XPS proposed by Microsoft Corporation, HP-GL/2, proposed by HP Inc., and the like exist.

Figure 3:
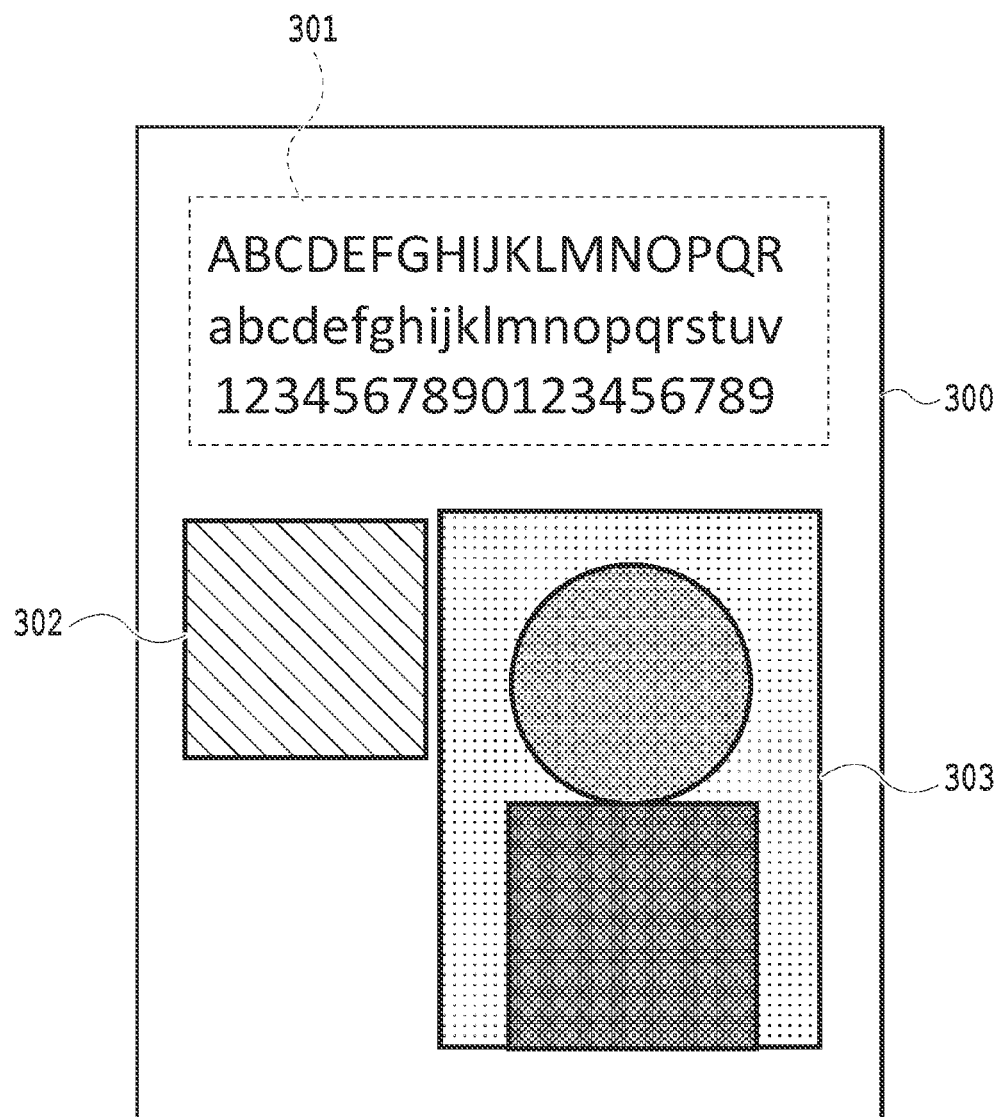
FIG. 3 is a diagram showing an example of a page image.

FIG. 3 is a diagram showing an example of an image corresponding to one page of an electronic document (in the following, called "page image"). Here, it is assumed that the size of a page image 300 shown in FIG. 3 is horizontal width of 600 pixels×vertical width of 900 pixels. In the following, PDL corresponding to the page image 300 is shown.

```
<PAGE = 001>
    <TEXT> 50, 50, 200, 100, BLACK, STD-18,
       "ABCDEFGHIJKLMNOPQR" </TEXT>
    <TEXT> 50, 100, 200, 150, BLACK, STD-18,
       "abcdefghijklmnopqrstuv" </TEXT>
    <TEXT> 50, 150, 200, 825, BLACK, STD-18,
       "123456789012345678" </TEXT>
    <BOX> 50, 300, 200, 450, GRAY, STRIPE </BOX>
    <IMAGE> 250, 300, 550, 800, "PORTRAIT.jpg" </IMAGE>
</PAGE>
```

<PAGE=001> in the first row of the above-described PDL is a tag indicating the page number. Normally, PDL is designed so as to be capable of describing a plurality of pages and in PDL, a tag indicating the divider of a page is described. The example described above indicates that the first page continues up to </PAGE> in the tenth row. In a case where the second page exists, <PAGE=002> is described. From <TEXT> in the second row up to </TEXT> in the third row is the TEXT drawing command. In the TEXT drawing command, the first two coordinates indicate coordinates (X1, Y1) of the top left of the drawing area and the two subsequent coordinates indicate coordinates (X2, Y2) of the bottom right of the drawing area. Following this, it is described that the color is "BLACK (black: R=0, G=0, B=0)", the character font is "STD (standard)", the character size is 18-point, and the character string to be drawn is "ABCDEFGHIJKLMNOPQR". From <TEXT> in the fourth row up to </TEXT> in the fifth row and from <TEXT> in the sixth row up to </TEXT> in the seventh row are also the TEXT drawing commands. The character strings to be drawn correspond to "abcdefghijklmnopqrstuv" and "1234567890123456789", respectively. From <BOX> up to </BOX> in the eighth row is the BOX drawing command and the first two coordinates indicate the coordinates (X1, Y1) of the top left, which is the starting point of drawing, and the two subsequent coordinates indicate the coordinates (X2, Y2) of the bottom right, which is the endpoint of drawing. Following this, as the color, "GRAY (gray: R=128, G=128, B=128)" is designated and as the fill pattern, "STRIPE (stripe pattern)" is designated. The ninth row is the IMAGE drawing command. The first two coordinates indicate the coordinates (X1, Y1) of the top left of the drawing area and the two subsequent coordinates indicate the coordinates (X2, Y2) of the bottom right of the drawing area. Then, it is described that the file name of the image existing in the designated drawing area is "PORTRAIT.jpg". Here, ".jpg" is an extension, indicating that the file is a JPEG file, which is a generally prevailing image compression format. Then, </PAGE> in the tenth row is the description indicating that the drawing of the page is completed. In many cases, in document data that is obtained actually, font data and an image file are added to the PDL data and integrated therein. The reason is that in a case where font data and an image file are managed separately, it is not possible to form the text/image portions by the drawing command alone and information is not sufficient to form a printing-target image. At this step, document data including the PDL data such as this is obtained by accessing the external PC.

At S202, information indicating authenticity of a printing-target electronic document is obtained. In the present embodiment, it is assumed that a request to obtain information indicating authenticity of an electronic document is transmitted to the above-described external PC via the NETWORK I/F 27 and the information is received/obtained. As the information indicating authenticity of an electronic document, here, document ID information is used. The document ID information is information of a predetermined number of bits (32 bits in the present embodiment), which is calculated using a hash function based on the above-described document data (data in which PDL data, font data, and image file are integrated). In a case where even one byte of the digital data constituting the electronic document is changed, different document ID information is calculated as a result, and therefore, a unique document ID is associated with one electronic document. It may also be possible to reduce the falsification risk of document ID information by storing/managing electronic document files and document ID information by the collaboration of a plurality of external PCs and adopting a system configuration like a block chain. Further, in a case where the PC 20 has sufficient resources and it is possible to perform management of document ID information within the PC 20, it is also possible to perform collation processing internally.

At S203, rendering processing is performed based on the document data obtained at S201. In this rendering processing, by performing each drawing command included in the PDL data, image data in the bitmap format, which consists of color information for each pixel, is generated. For example, in a case of the page image 300 in FIG. 3 described above, a bitmap image of 600×900 pixels is generated. In the present embodiment, it is assumed that R, G, and B of each pixel of the bitmap image is represented by eight bits, that is, in 256 tones.

At S204, for the bitmap image generated at S203, processing to embed the document ID information obtained at S202 is performed. The processing to embed document ID information in a bitmap image is called "embedding processing", "embedding encode processing" and the like. As regards the printed material obtained by printing a bitmap image for which the embedding processing has been performed, in a case where the printed material is copied, it is made possible to determine whether or not the copy-target printed material is the "printed material of the authentic original document" by extracting (decoding) the document ID information from the scanned image of the printed material.

Originally, handling information in an information processing apparatus, such as the PC 20, is equivalent to handling binary data. Binary data is information that is represented by a combination of "0" and "1" and by the information represented by "0" or "1" such as this is connected continuously, the combination of "0" and "1" becomes to have a specific meaning. For example, in a case where an English word "hello" is handled as binary data, in an example of Shift JIS, which is one of character codes, the alphabet "h" corresponds to binary data of "0110100)". Similarly, "e" corresponds to "01100101", "1" corresponds to "01101100", and "o" corresponds to binary data of "01101111". That is, it is possible to represent the character string "hello" as binary data of "01101000011001011101100011011000101111". On the contrary, in a case where it is possible to obtain the binary data "01101000011001011101100011011000101111", it is possible to obtain character information representing the English word "hello". Based on the notion such as this, it can be seen that it is possible to implement embedding by embedding predetermined data within an image in such a manner that "0" or "1" can be determined.

<Embedding Processing>

FIG. 4A and FIG. 4B are each an example of a mask consisting of 8×8 pixels, which is used for generating "0" and "1". FIG. 4A is a mask for generating "0" and FIG. 4B is a mask for generating "1". By adding the value within the mask to the pixel value in a bitmap image, it is possible to give a pattern having periodicity to each area of 8×8 pixels within the image. As described above, in the bitmap image of the present embodiment, one color is represented by eight bits and one value between 0 and 255 is allocated to each pixel. A value outside the range between 0 and 255 cannot be used as image data, and therefore, in a case where addition results in a value less than 0 or a value larger than or equal to 256, it is generally performed that the value of the addition results is replaced with 0 or 255 and thereby included within the valid range. In the masks in FIG. 4A and FIG. 4B, the pixel value is changed by "−10" or "0", but in a case where all the pixel values within the bitmap image corresponding to the mask area are "0", all the values in the area are "0". Here, the case where one color is represented by eight bits is explained, but the number of bits is not limited to this. In a case where a digital image is handled, despite that one color is represented by any number of bits, a valid range exists and it is not possible to change a value to another outside the range.

Figure 5A:
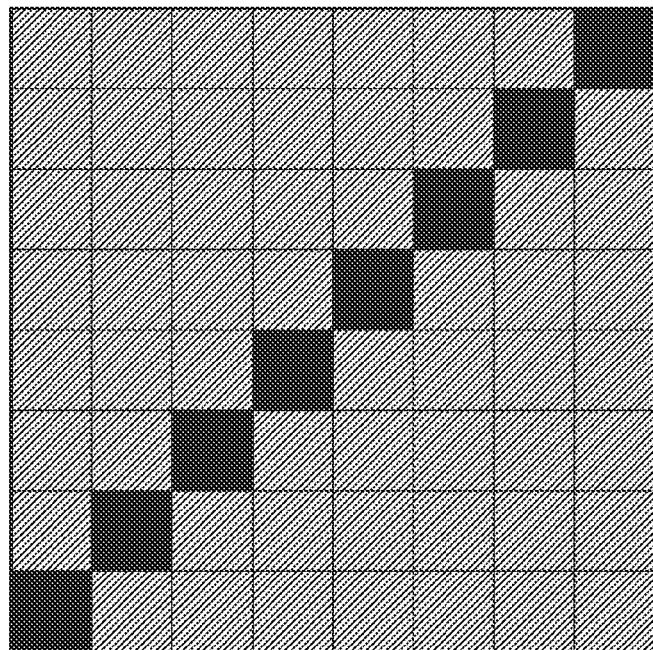
FIG. 5A and FIG. 5B are each a diagram showing a pattern that is formed by a mask.
Figure 5B:
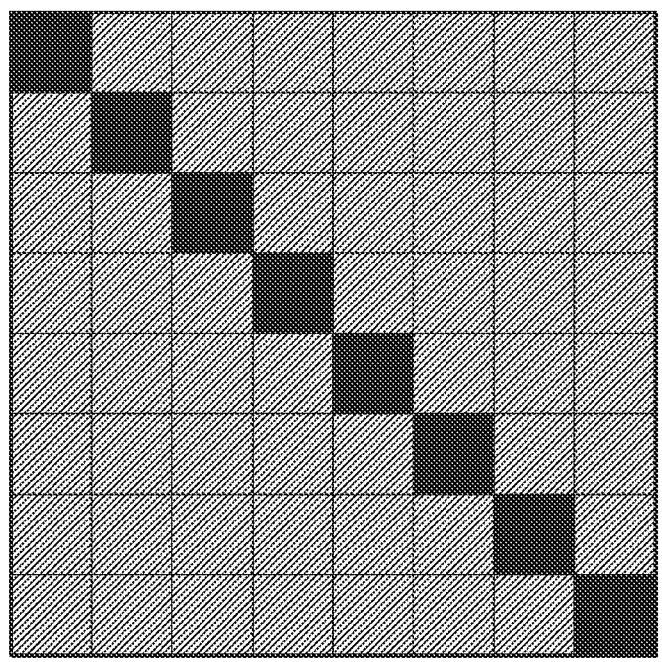

FIG. 5A and FIG. 5B are each a diagram visually showing what kind of pattern is formed in the bitmap image by the mask in each of FIG. 4A and FIG. 4B described above. The position of "−10" in the mask in each of FIG. 4A and FIG. 4B is represented in solid black and the position of "0" is represented by hatching. As can be seen from FIG. 5A and FIG. 5B, in the bitmap image to which the mask has been applied, a diagonal line extending in the lower-leftward direction appears as a "pattern representing 0" and a diagonal line extending in the lower-rightward direction appears as a "pattern representing 1".

Here, a pseudo code at the time of alternately applying the mask in FIG. 4A and the mask in FIG. 4B to the entire bitmap image is shown below.

```
01:     int i, j, k, l;
02:     int width = 600, height = 900;
03:     unsigned char *data = image data;
04:     int **maskA = mask data;
05:     bool isMaskA = true;
06:     for (j = 0; j < height; j+=8){
07:         for (i = 0; i < width; i+=8){
08:             for (k = 0; k < 8; k++){
09:                 for (l = 0; l < 8; l++){
10:                     if (isMaskA == true){
11:     data [(i+k)+(j+l)*width] += maskA[k][l]
12:                     }
13:         }
14:             }
15:         }
16:     }
```

In the present embodiment, embedment of the above-described pattern data is performed only for the B value among the RGB values each pixel of the bitmap image has. The reason is that in a case where printing is performed for the paper white area of a sheet in the four kinds of ink of CMYK, the capability of being visually recognized of Y ink is lower than that of each ink of CMK. At the time of embedding, it is preferable to cause the above-described pattern to be embedded to affect the original image as slightly as possible, that is, cause the above-described pattern to be visually recognized as less as possible. RGB, which are the three primary colors of light, and CMY, which are the three primary colors of color, are in a complementary color relationship and R and C, G and M, and B and Y are in opposite hues, respectively. This means that in a case where modulation is performed for the B value among the RGB values, the amount of use of Y ink largely changes. Consequently, in the present embodiment, control is performed so that the variation in density of Y ink becomes large by performing modulation for only the B value among the RGB values.

Figure 7A:
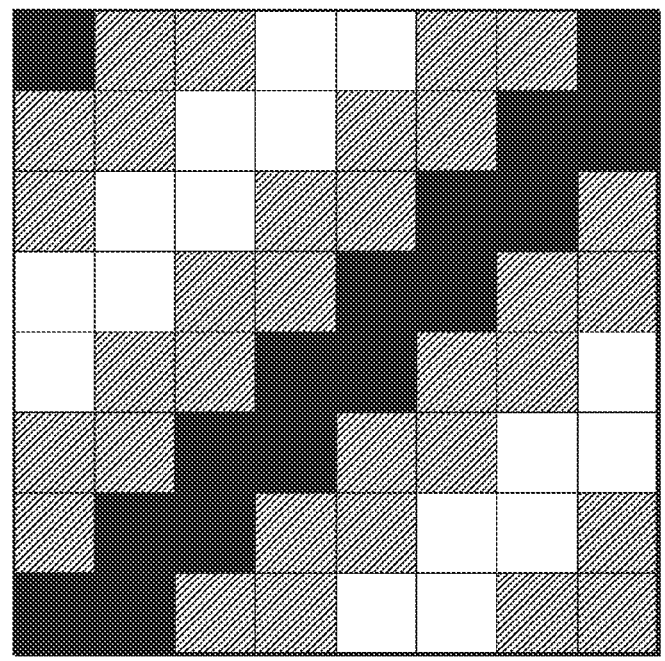
FIG. 7A and FIG. 7B are each a diagram showing a pattern that is formed by a mask.
Figure 7B:
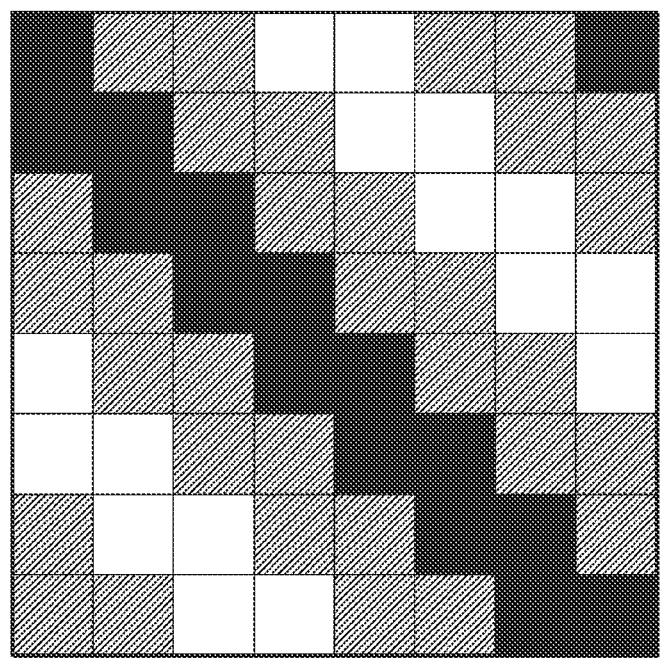

Here, in the case of the page image 300 shown in FIG. 3 described previously, the paper white area is sufficiently large and the area except for a TEXT drawing area 301, a BOX drawing area 302, and an IMAGE drawing area 303 is the paper white area. In this case, it may happen that it is not possible to perform embedment of the pattern data successfully for each drawing area except for the paper white area with the masks shown in FIG. 4A and FIG. 4B. For example, for the drawing area of solid black (R=0, G=0, B−0), the results after embedment are the same solid black (R−0, G−0, B−0). Consequently, in a case where embedment of pattern data is performed for the area other than the paper white area, particularly for the image drawing area, it is preferable to apply, for example, masks as shown in FIG. 6A and FIG. 6B. The masks in FIG. 6A and FIG. 6B are those that change each pixel of the bitmap image by "−10", "0", and "+10". In the case of the masks in FIG. 6A and FIG. 6B, even on a condition that all the pixel values of the bitmap image corresponding to the mask area are "0", the pixel value in the area is eventually "0" or "+10". Consequently, it is possible to perform embedment of pattern data for all the pixels within the bitmap image. FIG. 7A and FIG. 7B are diagrams visually showing what kinds of patterns are given to the bitmap image by the masks in FIG. 6A and FIG. 6B. The position of "−10" in the mask in each of FIG. 6A and FIG. 6B is represented in solid black, the position of "0" is represented by hatching, and the position of "+10" is presented in solid white. As can be seen from FIG. 7A and FIG. 7B, in the bitmap image after the mask has been applied, a plurality of diagonal lines extending in the lower-leftward direction whose densities are different appears as a "pattern representing 0" and a plurality of diagonal lines extending in the lower-rightward direction whose densities are different appears as a "pattern representing 1". In the TEXT drawing area and in the BOX drawing area, normally, the possibility that the many paper white areas exist is strong, and therefore, it is preferable to apply the masks in FIG. 4A and FIG. 4B. However, even in the TEXT drawing area and in the BOX drawing area, depending on the designated color, the thickness of a character and the like, there is a case where the masks in FIG. 6A and FIG. 6B are appropriate. Further, there is a case where even the IMAGE drawing area is very close to the paper white area. Because of this, it may also be possible to determine the type of mask that is applied by obtaining the density histogram in each drawing area, and so on. For example, in a case where the maximum value of RGB values is larger than a threshold value, the masks in FIG. 4A and FIG. 4B are applied and in a case where it is less than or equal to the threshold value, the masks in FIG. 6A and FIG. 6B are applied, and so on. Alternatively, in a case where the input color space is L*a*b*, it may also be possible to switch masks to be applied by comparing the L* value representing luminance with a threshold value. Due to this, it is made possible to implement secure embedment.

Explanation is returned to the flowchart in FIG. 2.

At S205, an image to be printed is generated based on the bitmap image generated at S204 and for which embedding has been performed (in the following, described as "embedded image"). For the generation of the image to be printed, it is sufficient to use a publicly known method. In the present embodiment, it is assumed that for each pixel of an embedded image, each piece of processing, such as color conversion processing, color separation processing, output characteristic conversion processing, and quantization processing, is performed. In the following, each piece of processing is explained briefly.

<<Color Conversion Processing>>

The color conversion processing is processing to convert the pixel values (RGB values) of an embedded image into values that can be reproduced appropriately by the MFP 10. Generally, the color value designated in the drawing command of PDL is the color value that is set so that the color value can be represented appropriately on a display, and therefore, in a case where the color value is output as it is by a printer, a tint different from that seen on the display is output. Consequently, the color conversion processing for absorbing the difference in color therebetween is performed.

For this color conversion processing, a three-dimensional lookup table (LUT) is used, which associates a combination of preferred output pixel values (Rout, Gout, Bout) with a combination of input pixel values (Rin, Gin, Bin) in an embedded image. Here, each of the input values Rin, Gin, and Bin has 256 tones. Because of this, it is ideal to prepare a table (Table1[256][256][256][3]) having a total of 16,777,216 (256×256×256) combinations of the output values (Rout, Gout, Bout) shown below.

$Rout=Table1[Rin][Gin][Bin][0]$ $Gout=Table1[Rin][Gin][Bin][1]$ $Bout=Table1[Rin][Gin][Bin][2]$ However, it may also be possible to use publicly known devices to reduce the table size, such as reducing the number of grids of the LUT from 256 grids to, for example, 16 grids or the like and determining the output value by interpolating the table value between grids.

<<Color Separation Processing>>

The color separation processing is processing to convert Rout, Gout, and Bout, which are the output values of the color conversion processing, into the output values of each ink color (here, four colors of CMYK) that is printed on a sheet by the ink jet method. There are also various implementation methods for this color separation processing. In the present embodiment, a three-dimensional lookup table (Table2[256][256][256][4]) is used, which associates a combination of ink color pixel values (C, M, Y, K) shown below with a combination of the above-described output pixel values (Rout, Gout, Bout).

$C=Table2[Rout][Gout][Bout][0]$ $M=Table2[Rout][Gout][Bout][1]$ $Y=Table2[Rout][Gout][Bout][2]$ $K=Table2[Rout][Gout][Bout][3]$ At this time, it is preferable only for the Y value among the CMYK values corresponding to the results of performing modulation for the paper white area by the embedding processing at S204 to have a value larger than 0. In more detail, it is preferable to set the CMYK values corresponding to the area in which the pixel values of R=255, G=255, and B=255 are converted into the pixel values of R=255, G=255, and B=245 so that the Y value is a value exceeding 0 and the CMK values are values smaller than the Y value and close to 0. The reason is that, as explained at S204, it is desired to reduce the capability of being visually recognized of the pattern that is embedded. As in the case of the above-described color conversion processing, it may also be possible to use publicly known devices to reduce the table size.

<<Output Characteristic Conversion Processing>>

The output characteristic conversion processing is processing to convert the density of each ink color of CMYK into a printed dot number ratio. Specifically, for example, the density of each color having 256 tones is converted into a dot number ratio of each color having 1,024 tones. For this output characteristic conversion processing, a one-dimensional lookup table (Table3[4][256]) is used, which sets printed dot number ratios (Cout, Mout, Yout, Kout) shown below, corresponding to the density of each ink color.

$Cout=Table3[0][C]$ $Mout=Table3[1][M]$ $Yout=Table3[2][Y]$ $Kout=Table3[3][K]$

As in the case of the color conversion processing and the color separation processing, which are described above, it may also be possible to use publicly known devices to reduce the table size.

<<Quantization Processing>>

The quantization processing is processing to convert the above-described printed dot number ratios (Cout, Mout, Yout, Kout) of each ink color into quantized values (Cdot, Mdot, Ydot, Kdot) shown below, representing ON or OFF of the printed dot of each pixel.

$Cdot=Halftone[Cout][x][y]$ $Mdot=Halftone[Mout][x][y]$ $Ydot=Halftone[Yout][x][y]$ $Kdot=Halftone[Kout][x][y]$ The above values are quantized values in a case of the dither method and by making a comparison with the threshold value within the dither matrix in accordance with each pixel position, it is possible to obtain the value representing ON or OFF of the printed dot of each ink color. Here, the occurrence probability of each printed dot is Cout/1,023, Mout/1,023, Yout/1,023, and Kout/1,023. The method of the quantization processing is not limited to the dither method and it may also be possible to use another method, for example, such as the error diffusion method.

By performing each piece of processing explained above in order, an image to be printed is generated from an embedded image. Explanation is returned to the flowchart in FIG. 2.

At S206, the data of the image to be printed that is generated at S205 is transmitted along with printing instructions thereof to the MFP 10 or another printer, not shown schematically, and print processing is performed by the printer at the transmission destination.

The above is the flow until the printed material of the authentic original document is generated. In the embedding processing (S204), modulation is performed for the B value among the RGB values in the present embodiment, but it may also be possible to perform modulation for the CMYK values. In this case, the pixel values of the paper white area are Y=0, M=0, C=0, and K=0, and therefore, it is necessary to use a positive value for modulation. In the case of the masks illustrated in FIG. 4 and FIG. 6 described previously, it is sufficient to invert the sign of the value for which modulation has been performed within the mask, that is, invert "−10" to "+10" and "+10" to "−10". In a case where modulation has been performed for the CMYK values as described above, the controllability at the time of limiting the ink that is attached to the paper white area only to Y ink becomes high. On the other hand, in a case where modulation is performed for the RGB values, the controllability to suppress the variation in hue at the time of performing embedment into the image drawing area becomes high. Consequently, it is preferable to select a preferred modulation method in accordance with the characteristic of the printing process, such as electrophotography and ink jet, the paper white/text/image area ratio within the printing-target page image, and the like.

<Copy Processing of "Printed Material of Authentic Original Document">

Figure 8:
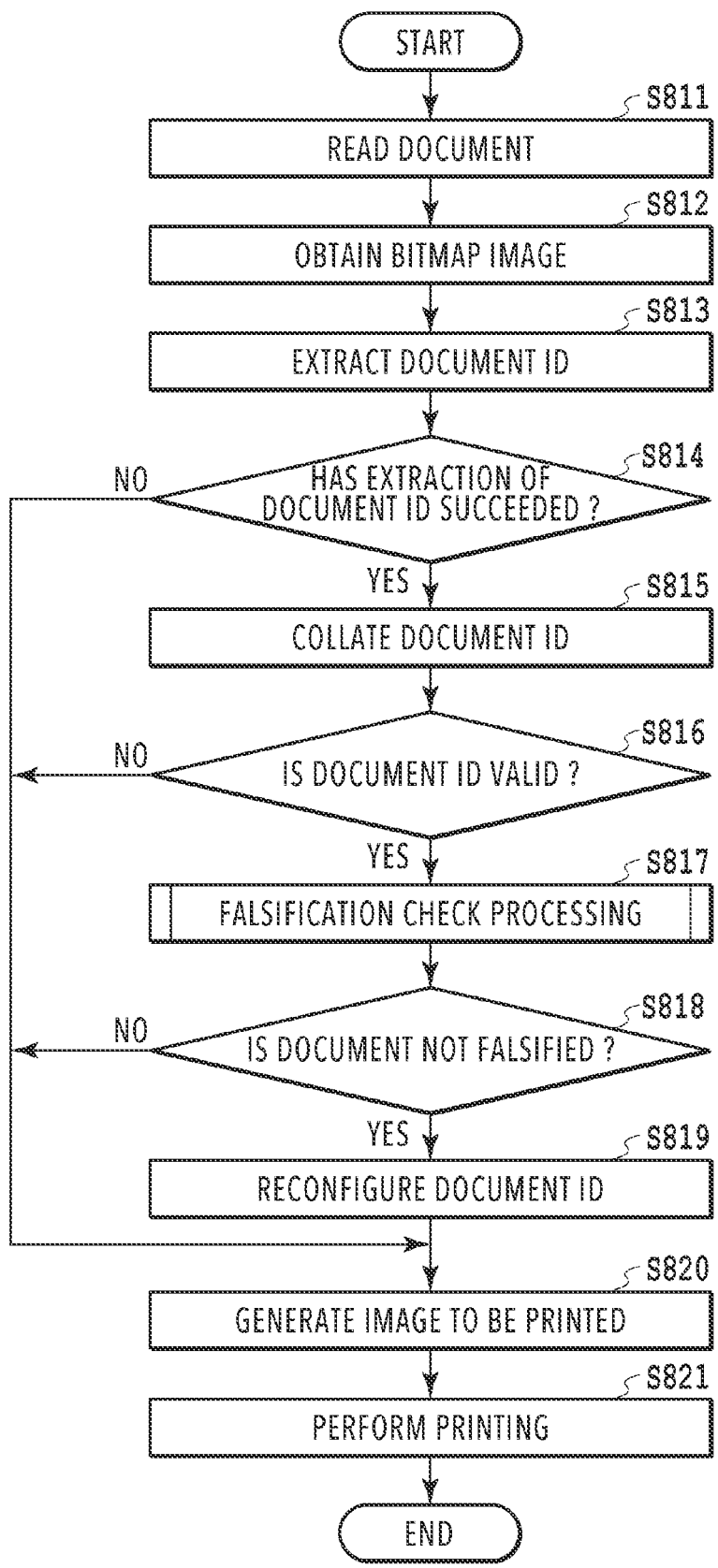
FIG. 8 is a flowchart showing a flow in a case where a printed material of an authentic original document is copied.

Following the above, the flow at the time of copying the "printed material of the authentic original document", which is the resultant material of the print processing of the authentic original document described above, is explained with reference to the flowchart in FIG. 8. The series of processing shown in the flowchart in FIG. 8 is started by a user setting the printed material of the authentic original document on a document table, not shown schematically, via the UI (User Interface) of the MFP 10 and giving copy instructions. In the following explanation, symbol "S" means a step.

First, at S811, the copy-target printed material that is set to the MFP 10 is read by a built-in scanner unit (not shown schematically). In this reading of the printed material, the printed material placed on the document table is irradiated with LED light and the reflected light is converted into an analog electric signal by an image capturing element, such as CCD, opposed to each pixel.

At next S812, the analog electric signal obtained at S811 is digitized and a bitmap image in the RGB color space is obtained. At this time, for each pixel of the bitmap image, image processing, such as MTF correction processing, input correction processing, shading correction processing, and color conversion processing, is performed. In the following, each piece of processing is explained briefly.

<<MTF Correction Processing>>

The MTF (Modulation Transfer Function) correction processing is correction processing relating to the resolution among the reading performances of the scanner unit. In a case where an image is read optically by the scanner unit, due to the shift from the position in focus, the limit of the performance of the lens itself, and the like, the image is blurred, and therefore, restoration to a certain extent is performed by filter processing and the like. At this time, in a case where enhancement processing so strong that perfect restoration will result is performed, image impairment, such as the white area and enhancement of the image noise/dust pixel, becomes conspicuous, and therefore, it is necessary to design the filter strength by taking balance between image improvement and impairment. The following is an example of an edge enhancement filter that quintuples the center portion of the image and multiplies the values of the pixels located above, below, to the left, and to the right by −1.

$R'[x][y]=R[x][y]\times 5-R[x-1][y]-R[x+1][y]-R[x][y-1]-R[x][y+1]$ $G'[x][y]=G[x][y]\times 5-G[x-1][y]-G[x+1][y]-G[x][y-1]-G[x][y+1]$ $B'[x][y]=B[x][y]\times 5-B[x-1][y]-B[x+1][y]-B[x][y-1]-B[x][y+1]$ <Input Correction Processing>>

The input correction processing is processing to convert the output value of the CCD (image capturing element), which is originally a photon quantity, into the lightness matching with the sensitivity of the human eyes. Due to this, for example, R'G'B' signals of each color having 4.096 tones are converted into color intensity values (R", G", B") of each color having 1,024 tones. For this conversion, a one-dimensional lookup table (Table4[4][4096]) shown below is used, which sets the preferred printed dot number ratio for the density of each color.

$R''=\text{Table4}[0][R']$ $G''=\text{Table4}[1][G']$ $B''=\text{Table4}[2][B']$ However, it may also be possible to use publicly known devices to reduce the table size, such as reducing the number of grids of the LUT from 4,096 grids to, for example, 256 grids or the like and determining the output value by interpolating the table value between grids.

<<Shading Correction Processing>>

The shading correction processing is processing to reduce the color/density unevenness caused by the difference in reading sensitivity at each pixel position resulting from the variation of manufacturing and the variation of assembling of the parts, such as the lens, LED and CCD, which configure the scanner device. For example, R"G"B" signals of each color having 1,024 tones are converted into color intensity values (R''', G''', B''') of each color having 256 tones. For this conversion, a one-dimensional lookup table (Table5[x][3][1024]) shown below is used, which specifies the density adjustment value for each pixel position in the X-direction (direction in which the scanner lens is arranged).

$R'''=\text{Table5}[x][0][R'']$ $G'''=\text{Table5}[x][1][G'']$ $B'''=\text{Table5}[x][2][B'']$ As in the case of the input correction processing described above, it may also be possible to use publicly known devices to reduce the table size.

<<Color Conversion Processing>>

The color intensity values (R''', G''', B''') of each color having 256 tone, which are calculated by the processing so far, are values unique to the scanner unit in contrast to those at the time of printing. The color conversion processing here is processing to convert the values unique to the scanner unit into preferred RGB values (Rout, Gout, Bout values) for display on the display device. Here, each of R''', G''', and B''', which are input values, has 256 tones. Consequently, for this conversion, a three-dimensional lookup table (Table6[256][256][256][3]) shown below is used, having the output values of a total of 16,777,216 (256×256×256) combinations.

$Rout=\text{Table1}[R'''][G'''][B'''][0]$ $Gout=\text{Table1}[R'''][G'''][B'''][1]$ $Bout=\text{Table1}[R'''][G'''][B'''][2]$ As in the case of the input correction processing and the shading correction processing, which are described above, it may also be possible to use publicly known devices to reduce the table size. In this manner, a bitmap image is obtained.

At S813 that follows, for the bitmap image obtained at S812, processing to extract document ID information is performed. Specifically, processing to determine whether the pattern indicating "0" or "1", which is described previously, is formed within the bitmap image for each predetermined area (here, 8-8 pixels) and extract information on a sequence represented by "0" and "1" is performed. By repeatedly applying this to the entire bitmap image, the document ID information embedded by the embedding processing at the time of printing of the authentic original document is decoded. There is a case where the information embedded by the embedding processing is called "embedded information". Here, decoding processing of embedded information is explained in detail.

<<Decoding Processing of Embedded Information>>

Figure 9:
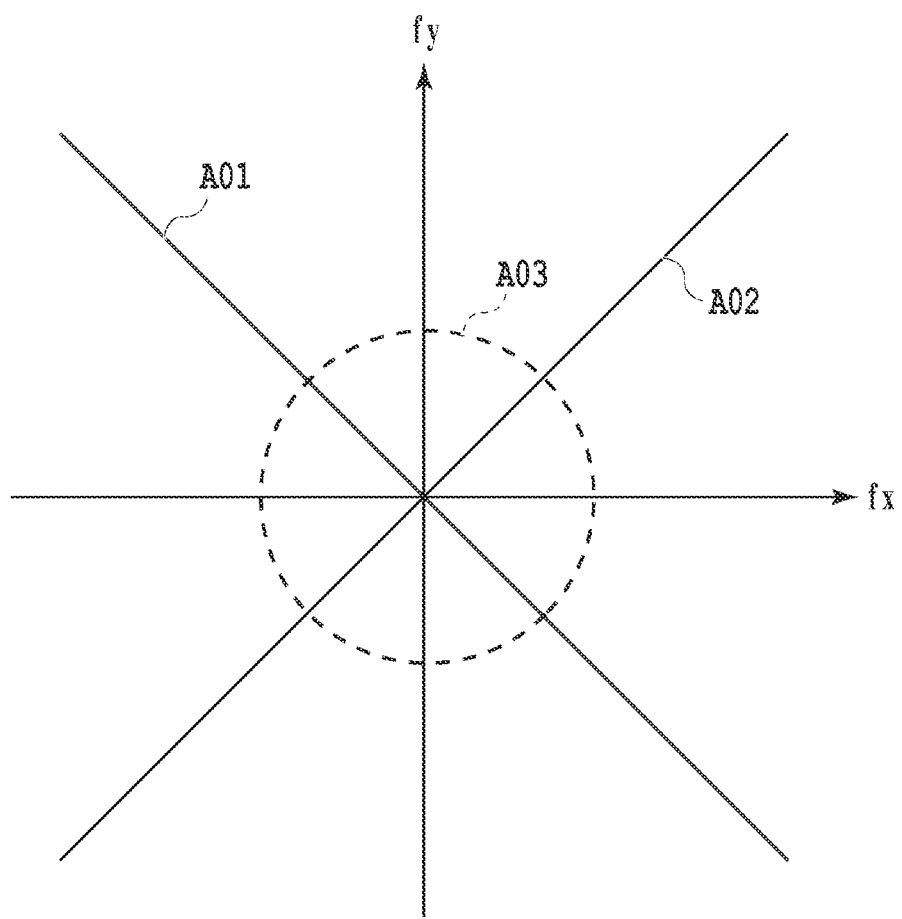
FIG. 9 is a diagram showing a characteristic of a spatial frequency of a pattern used for embedment.

First, the position at which embedded information is embedded within the obtained bitmap image is detected. It is possible to detect the embedment position by analyzing the spatial frequency characteristic for each unit area (here, area of 8×8 pixels). FIG. 9 is a diagram showing the characteristic of the spatial frequency of the pattern used for embedment. The horizontal axis represents the frequency in the horizontal direction and the vertical axis represents the frequency in the vertical direction and as the position becomes more distant from the origin, the frequency of the area becomes higher. In the present embodiment, the two kinds of pattern corresponding to "0" and "1", respectively, are embedded in the image (see FIG. 5 and FIG. 7 described previously). At that time, subtraction of a value of "10" is performed for the B component of each color component of RGB (in the case of the mask in FIG. 4. In the case of the mask in FIG. 6, addition and subtraction). Due to this, for example, the pattern extending in the lower-leftward direction that is formed within the image by the mask in FIG. 4A causes a large power spectrum to occur on a line A02. Similarly, the pattern extending in the lower-rightward direction that is formed within the image by the mask in FIG. 4B causes a large power spectrum to occur on a line A01. Because of this, by detecting this power spectrum, it is possible to extract the data of "0" or "1". By performing edge detection as the preprocessing of the power spectrum detection, it is also possible to enhance the power spectrum.

The data extraction by the above-described frequency analysis requires accurate cutout of the analysis area from the image data, and therefore, processing to correct the shift in the coordinate position is also performed. For example, first, the cutout of the unit area from the bitmap image and the frequency analysis are repeated in the horizontal and vertical directions while shifting the pixel one by one. In a case of the image size whose horizontal width is 600 pixels and whose vertical width is 900 pixels, the cutout and the frequency analysis are repeated a total of 64 times. Then, the position at which the spectrum is strongest is taken as the reference position of cutout. Then, by extracting the embedded information based on the reference position, it is possible to obtain the embedded sequence of "0" or "1" with a high accuracy.

In the present embodiment, as explained at S204, the embedded information that is the target of embedment is data of text whose character codes are written in numerical values by "Shift JIS". In this case, in the single-byte code (half-width character) of Shift JIS, for example, the alphabet "h" corresponds to binary data "01101000", "e" to "01100101", "l" to "01101100", and "o" to "01101111", respectively. Consequently, in a case where the extracted sequence of embedded information is "01101000011001010110110001101100001101111", the character string "hello", which is the English word, is obtained. In this manner, the document ID information embedded as embedded information is extracted.

Explanation is returned to the flowchart in FIG. 8.

At S814 that follows, whether or not the extraction of document ID information has succeeded at S813 is determined. In a case where the extraction of document ID information has succeeded, the processing advances to S815 and in a case where the extraction has failed, the processing advances to S820. Here, as the case where the extraction fails, there are considered two possibilities as follows. The first possibility is a case where document ID information has not originally been embedded in the copy-target printed material itself (possibility 1). The other is a case where document ID information has been embedded in the copy-target printed material, but it is not possible to correctly detect the predetermined pattern representing embedded information because the printed material is stained, handwritten characters are added later, and the like (possibility 2). Here, in a case of possibility 1, the processing may advance to S820 without performing anything. On the other hand, in a case of possibility 2, it may also be possible to give a notification to a user by displaying a message or the like to the effect that "the authentic document (printed material of the authentic original document) in which document ID information is embedded is about to be copied". Due to this, it is possible for the user to know that he/she is going to copy a printed material having the possibility of being not authentic and the user is given a chance to select abortion of the copy work or the like. For example, in a case where the results obtained by the extraction processing are not less than one bit and not more than 31 bits among the document ID information of a total of 32 bits, it is sufficient to determine possibility 2 and give the notification such as this. There may be a case where one pattern similar to the above-described predetermined pattern is included within the image by chance. In view of the rare case such as this, it is preferable to determine possibility 1 in a case where only less than 16 bits, which are half 32 bits, can be extracted and determine possibility 2 in a case where not less than 16 bits and not more than 31 bits are extracted.

At S815 that follows, collation processing of the document ID information that has been extracted successfully is performed. In the present embodiment, as in the document ID information obtaining processing at S202, it is assumed that the MFP 10 accesses the external PC and makes a request for collation and obtains collation results. Specifically, it is assumed that the MFP 10 transmits a request for collation of whether the extracted document ID information is valid information that is registered formally via a network I/F, not shown schematically, and receives/obtains collation results from the external PC. It may also be possible to adopt a system configuration, such as a block chain, in which management of document ID information is performed by a plurality of external PCs in cooperation with one another and this is the same as S202 described previously.

Next, at S816, the processing is branched in accordance with whether or not the above-described collation results indicate that the document ID information extracted at S813 is valid information registered formally. In a case where the document ID is valid, the processing advances to S817 and in a case where the document ID is invalid, the processing advances to S820. Here, in a case where the document ID is invalid, it may also be possible to give a notification to a user by displaying a message or the like to the effect that "an unauthentic document whose document ID is invalid is about to be copied". Due to this, the user is given a chance to select abortion of the copy work or the like.

At S817, processing to check whether or not the copy-target printed material has been falsified (falsification check processing) is performed. A rough flow of this falsification check processing is as follows. First, the MFP 10 transmits a request to obtain document data along with document ID information to the external PC via a network I/F, not shown schematically. Then, the MFP 10 receives/obtains document data (PDL data) associated with the document ID information from the external PC and performs rendering processing for the document data. The processing up to this rendering processing is the preprocessing. Then, the MFP 10 determines the presence/absence of falsification by comparing the bitmap image obtained by the rendering processing and the bitmap image obtained at S812. Here, along another flowchart shown in FIG. 10, the falsification check processing is explained in detail. In the explanation of the flow in FIG. 10, the bitmap image obtained by the rendering processing is described as "rendering image" and the bitmap image obtained by the document reading processing is described as "scanned image".

<Details of Falsification Check Processing>

At S1001, initialization processing of a counter that counts the pixels determined to have been falsified at S1010, to be described later, is performed. Specifically, the count number (number of falsified pixels) of the counter is set to "0".

At next S1002, normalization processing is performed for the scanned image obtained at S812. This normalization processing is performed for matching the dynamic range between the scanned image and the rendering image. For example, the brightest portion of the scanned image is generally the color of the paper of the reading-target printed material and a value having some kind of density in principle. On the other hand, the brightest portion of the rendering image is the pixel whose pixel values are R=255, G=255, and B=255. Further, the darkest portion of the scanned image is generally black of ink or toner and a value having some kind of lightness due to reflected light in principle. On the other hand, the darkest portion of the rendering image is the pixel whose pixel values are R=0, G=0, and B=0. As described above, there are originally differences in the brightest color and in the darkest color between both the images. Further, in a case where the printed material is output in color, there is also a difference in tint between both images. For example, as regards the most vivid red that can be printed, compared to the pixel values (R=255, G=0, B=0) indicating the most vivid red on the rendering image, the saturation in the scanned image is low. Consequently, normalization is performed for the values (RGB values) of each pixel of the scanned image by using formula (1) to formula (3) below and new pixel values (Rnorm, Gnorm, Bnorm) are found.

$$Rnorm=(R-Rd)/(Rw-Rd)\times 255 \quad \text{formula (1)}$$

$$Gnorm=(G-Gd)/(Gw-Gd)\times 255 \quad \text{formula (2)}$$

$$Bnorm=(B-Bd)/(Bw-Bd)\times 255 \quad \text{formula (3)}$$

By the normalization processing using formula (1) to formula (3) described above, the RGB values of the brightest color (white) of the scanned image are R=255, G=255, and B=255 and the RGB values of the darkest color (black) are R=0, G=0, and B=0.

At next S1003, filter processing is performed for the scanned image for which the normalization processing has been performed. The filter processing is processing to perform stronger edge enhancement in order to make easy the comparison with the rendering image.

At S1004 that follows, processing to remove the image pattern representing the embedded information from the scanned image for which the filter processing has been performed. In the image to be printed, which is generated at S205 in the flow in FIG. 2 described previously, a difference from the original document image (image of the electronic document that is the authentic original document) has occurred due to the embedding processing (S203). Consequently, in order to remove the difference as much as possible, this processing is performed. Specifically, processing to subtract the pattern data embedded by the embedding processing from the scanned image is performed. Due to this, it is possible to put the scanned image close to the state before the embedding processing is performed. In the present embodiment, this is implemented by adding a value to each pixel of the scanned image, the value being obtained by embedding each value in the masks in FIG. 4 and FIG. 6 described previously by "−1".

Next, at S1005, processing to compare the scanned image from which the embedded information has been removed and the rendering image is performed. Specifically, processing to compare the rendering image and the scanned image from which the embedded information has been removed for each pixel and find difference values (ΔR, ΔG, ΔB) expressed by formula (4) to formula (6) below is performed.

$$\Delta R=|R[x][y] \text{ of rendering image}-R[x][y] \text{ of scanned image}| \quad \text{formula (4)}$$

$$\Delta G=|G[x][y] \text{ of rendering image}-G[x][y] \text{ of scanned image}| \quad \text{formula (5)}$$

$$\Delta B=|B[x][y] \text{ of rendering image}-B[x][y] \text{ of scanned image}| \quad \text{formula (6)}$$

Next, at S1006, whether or not the difference values (ΔR, ΔG, ΔB) obtained at S1005 exceed threshold values is determined. In the present embodiment, the difference values (ΔR, ΔG, ΔB) are compared with threshold values (Rth, Gth, Bth) provided in advance for each channel of RGB and in a case where one of ΔR, ΔG, and ΔB exceeds the corresponding threshold value, the processing advances to S1007 and none of ΔR, ΔG, and ΔB exceeds each corresponding threshold value, the processing advances to S1008. The threshold value is determined in view of the characteristics and the like of the scanner unit and the printing apparatus and in a case of the present embodiment, it is sufficient to set values, for example, such as Rth=Gth=Bth=64.

At S1007, the count value of the counter, which indicates the number of falsified pixels, is incremented (+1). After the increment of the counter, the processing advances to S1008. Then, at S1008, whether or not the comparison of the pixel value is completed for all the pixels is determined. In a case where there is an unprocessed pixel, the processing returns to S1005 and the processing is continued and in a case where the comparison of the pixel value is completed for all the pixels, the processing advances to S1009.

At S1009, whether or not the count value of the counter, which indicates the number of falsified pixels, exceeds a threshold value is determined. It is sufficient to set the threshold value in this case to a value, for example, such as 3% of the total number of pixels, by supposing a situation in which dust is mixed in at the time of obtaining the scanned image. In a case where the count value exceeds the threshold value, the processing advances to S1010 and in a case where the count value does not exceed the threshold value, the processing advances to S1011.

At S1010, it is determined that the results of the falsification check processing indicate that there is no falsification and this processing is exited. On the other hand, at S1011, it is determined that the results of the falsification check processing indicate that there is falsification and this processing is exited.

The above is the contents of the falsification check processing. In the present embodiment, the comparison is performed for each pixel, but the comparison is not limited to this and it may also be possible to perform the comparison with a larger size, for example, such as comparing average values for each cluster of a plurality of pixels. In a case where the falsification check processing is completed, the processing advances to S818 in FIG. 8.

Explanation is returned to the flowchart in FIG. 8.

At S818, the processing is branched in accordance with the results of the falsification check processing of the bitmap image obtained at S812. In a case where there is no falsification, the processing advances to S819 and in a case where there is falsification, the processing advances to S820. In a case where the results of the falsification check processing indicate that there is falsification, it may also be possible to give a notification to a user by displaying a message or the like to the effect that "the falsified document is about to be copied". Due to this, the user is given a chance to select abortion of the copy work or the like.

Figures 11A, 11B:
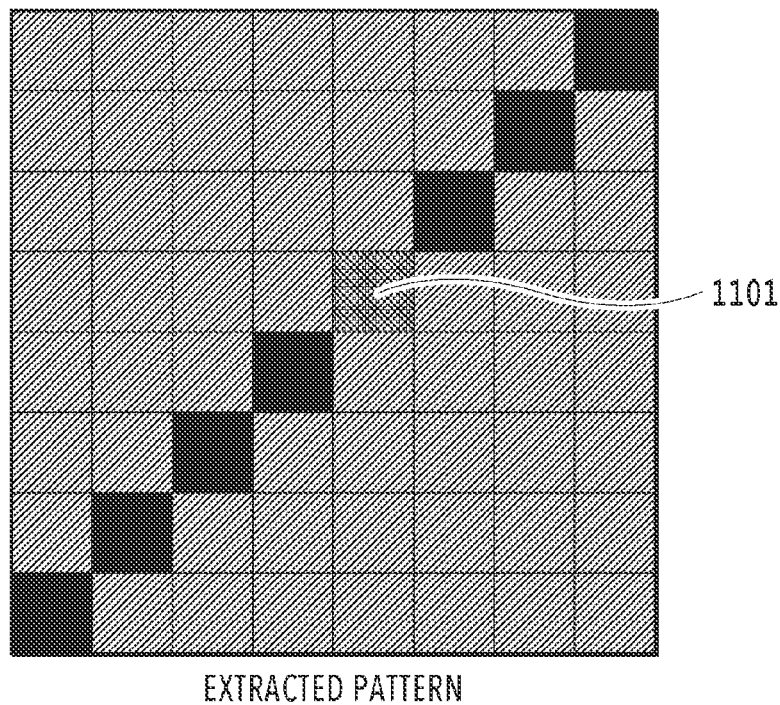
FIG. 11A is a diagram showing an example of a case where a pattern has deteriorated and FIG. 11B is a diagram showing a pattern reinforcement mask corresponding to FIG. 11A.

Next, at S819, processing to reconfigure information indicating authenticity of the document, which is embedded in the bitmap image obtained at S812, is performed. Specifically, processing to reinforce a portion at which intensity has become low in the predetermined pattern data embedded in the bitmap image is performed. The reason is that there is a possibility that the pattern data obtained by reading from the printed material and embedded has deteriorated as described above. FIG. 11A is a diagram showing an example in a case where the pattern representing "0" in FIG. 5A has deteriorated. In the original pattern in FIG. 5A, a diagonal line extending in the lower-leftward direction should appear by the solid black pixels, but a pixel 1101 represented by hatching appears at a portion thereof. This indicates the pixel for which it has not been possible to implement the predetermined density. In this situation, the difference from another pixel represented by hatching becomes small and the diagonal line extending in the lower-leftward is formed as a discontinuous line. That is, the embedment intensity of the pattern data has become low by an amount corresponding thereto. In a case where the pattern as shown in FIG. 11A is detected from the bitmap image obtained at S812, it is possible to determine that the intensity of the embedded information has become low. In a case where the intensity of the embedded information has become low as described above, processing to reinforce the portion at which the extracted pattern data has deteriorated is performed by using the pattern reinforcement mask. FIG. 11B shows the pattern reinforcement mask corresponding to FIG. 11A.

The pattern reinforcement mask in FIG. 11B is a mask that further gives a change of "−5" to a pixel position 1102 for which it has not been possible to implement the predetermined density. It may also be possible to set the magnitude of a change that is given based on the difference in value between the pixel 1101 for which it has not been possible to implement the predetermined density and the solid black pixel, or set a predetermined value. Then, for the image area for which the intensity of the embedded information is determined to be low in the bitmap image, processing to reinforce the pattern data is performed by applying the pattern reinforcement mask as described above. It may also be possible to determine that the embedded information has become low in intensity also in a case where error correction has been performed at the time of extraction of the document ID at S813 and perform the same reinforcement processing for the portion for which the correction has been performed. In a case where the pattern data is embedded only in a specific color plane, it is sufficient to apply the pattern reinforcement mask only to the specific plane.

At next S820, an image to be printed is generated based on the bitmap image for which the reconfiguration processing of the embedded information has been performed at S819. This processing corresponds to S205 in the flow in FIG. 2 described previously and there is no difference in particular, and therefore, explanation is omitted. At S821 that follows, print processing using the image to be printed that is generated at S820 is performed.

The above is the flow of the processing at the time of copying the printed material of the authentic original document. In the present embodiment, the example is explained in which the embedded information whose intensity is sufficient is implemented in the copied material by reinforcing the already-embedded pattern data by applying the pattern reinforcement mask to the bitmap image that is read at S812, but it is also possible to implement this by the method as follows.

Modification Example 1

It may also be possible to embed information indicating authenticity of a document by performing embedding processing anew after removing the embedded pattern data from the bitmap image obtained at S812. As the method of removing the pattern data embedded in the bitmap image, there is a method of applying a smoothing filter of a predetermined size to the bitmap image that is read at S812. The filter size at this time is set based on, for example, the size (for example, 8×8 pixels) of the embedded pattern. Further, it may also be possible to calculate an inverse filter from the embedded pattern and apply the inverse filter to the bitmap image. Furthermore, in a case where the pattern is embedded in the paper white area of a sheet, it may also be possible to perform processing to return the pixel value to the paper white state by the under color removal or the like. It may also be possible to embed the document ID information extracted at S813 by the same method as that at S204 in the flow in FIG. 2 described previously for the bitmap image from which the embedded pattern has been removed. In a case where the pattern data is embedded only in a specific color plane, it is sufficient to apply the removal processing of the pattern data only to the specific plane.

Modification Example 2

There is a method in which the original document data is obtained based on the document ID information extracted at S813 and the document ID information is embedded anew in the original document data. In this case, it is sufficient to transmit the document ID information extracted at S813 to the external PC, obtain the document data (PDL data) associated with the document ID information, obtain the bitmap image by performing rendering processing by using the obtained PDL data, and embed the document ID information anew by performing embedding processing for the bitmap image.

By relying on any of the methods described above, it is made possible to implement embedded information whose intensity is sufficient in a copied material.

Second Embodiment

In the first embodiment, the example is explained in which the document ID information is embedded for each area of 8×8 pixels. By this method, the predetermined pattern is formed in the high-frequency area within the image, and therefore, it is made possible to embed information in such a manner that a user is unlikely to visually recognize the information. Next, an aspect is explained as a second embodiment in which document ID information is turned into a QR code and the QR code is embedded in such a manner that the QR code is unlikely to be visually recognized. In the following, the embedment method, which is a different point from the first embodiment, is explained and the other explanation is omitted.

Figure 12A:
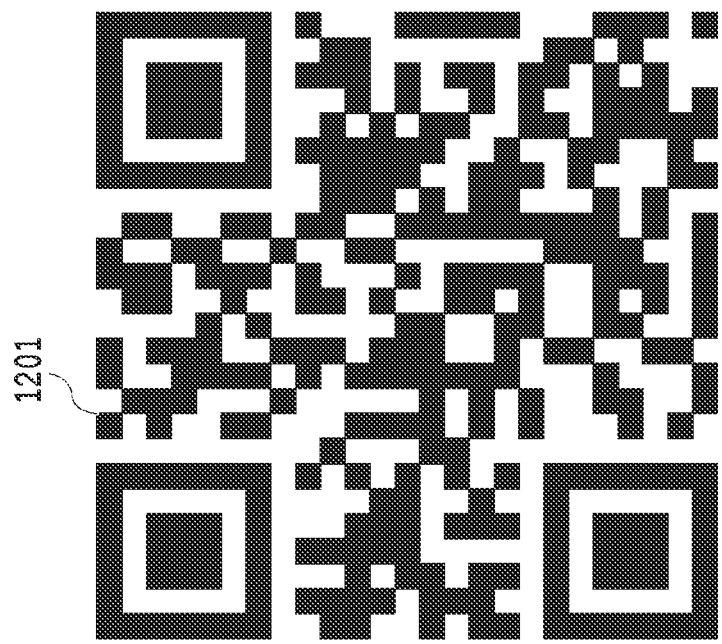
FIG. 12A and FIG. 12B are explanatory diagrams in a case where document ID information is embedded by being turned into a QR code (registered trademark).
Figure 12B:
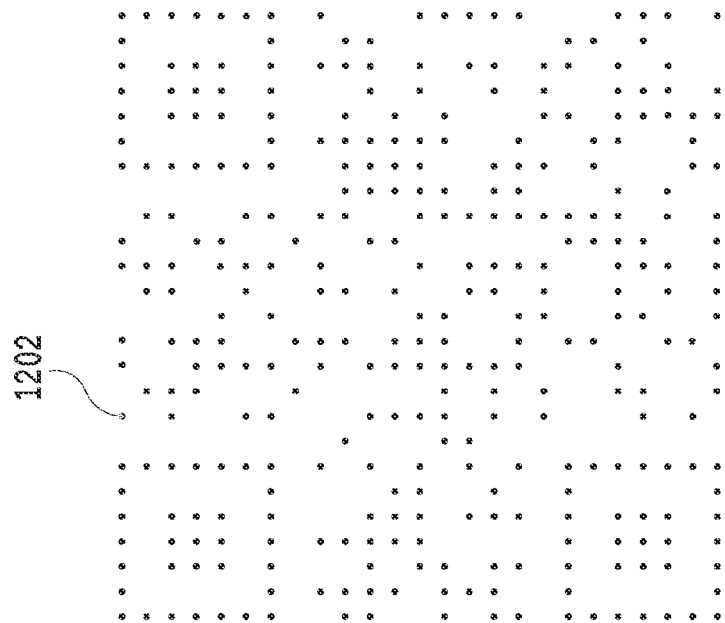

FIG. 12A shows an example of a QR code and FIG. 12B shows an actual print pattern corresponds thereto. In the example in FIG. 12B, the pattern is such that one dot is formed for each area of 8×8 pixels. The dot corresponding to a black pixel 1201 in the QR code in FIG. 12A corresponds to one dot 1202 in the print pattern shown in FIG. 12B. That is, at the position corresponding to the white pixel in the QR code in FIG. 12A, the dot of the print pattern is not formed. As a flow of specific processing to implement this, first, document ID information is turned into a QR code in the embedding processing (S204) in the flow in FIG. 2 described previously and then the QR code is converted into pattern data of a group of discrete dots and embedded in the rendering image for each predetermined area. Then, in the next image to be printed generation processing (S205), by causing the discrete dots to be formed only in Y ink, it is possible to make the dots more unlikely to be visually recognized.

Then, in the copy processing of the printed material in which document ID information is embedded by the method of the present embodiment, it is sufficient to extract a QR code pattern formed by yellow dots in units of 8×8 pixels from the bitmap image having read the document ID information and extract the document ID information by decoding the QR code pattern.

Further, as an embedment method of other than a QR code, for example, it may also be possible to perform embedding by performing threshold value modulation at the time of, for example, quantization processing (see Japanese Patent Laid-Open No. 2006-270972).

Modification Example 2

In the explanation so far, it is premised that the document ID information indicating authenticity is embedded in such an aspect in which a user is as unlikely to visually recognize the document ID information as much as possible in the print processing of the authentic original document. However, it may also be possible to embed document ID information in such an aspect (for example, modulation is performed also for the R value and the G value that cause the variation in density of each ink of CMYK to be large) in which a user can visually recognize the document ID information with ease.

In that case, in the copy processing thereof, it may also be possible to print the rendering image that is generated at the time of preprocessing of the falsification check processing (S817) as it is, or print the bitmap image from which embedded data has been removed (S1004) as it is. By performing printing by one of these methods, a printed material in which document ID information is not embedded is output. In this case, from the user side, it seems that pattern data that can be visually recognized is not printed in the paper white area of the printed material obtained by copying, and therefore, it is possible to easily recognize that the printed material is not the "printed material of the authentic original document". Further, the embedded data does not exist in the printed material that is copied and output, and therefore, in a case where the printed material become further the target of copying, the determination results at S814 are No without fail.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where information embedded in a printed material of an authentic original document has deteriorated, it is possible to obtain a copied material in which necessary information is embedded with a sufficient intensity.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-024396, filed Feb. 18, 2021 which is hereby incorporated by reference wherein in its entirety.

What is claimed is:

1. An image processing apparatus having a copy function, the image processing apparatus comprising:
  a memory that stores a program; and
  a processor that executes the program to perform:
    obtaining a scanned image by scanning a copy-target printed material;
    extracting embedded information from the scanned image by detecting a predetermined pattern from the scanned image;
    generating an image to be printed based on the scanned image; and
    performing print processing using the image to be printed, wherein
  in the generating, in a case where it is confirmed that the copy-target printed material is an authentic document by the extracted embedded information, the image to be printed is generated by reinforcing a portion at which intensity has become low in the predetermined pattern detected from the scanned image.

2. The image processing apparatus according to claim 1, wherein
  in the generating, the reinforcement is performed by using a mask that gives a change to a pixel for which it has not been possible to implement a predetermined density among pixels forming the predetermined pattern.

3. The image processing apparatus according to claim 1, wherein
the embedded information is represented by binary data represented by a combination of 0 and 1 and
the predetermined pattern is a pattern indicating 0 or 1.

4. The image processing apparatus according to claim 1, wherein
the embedded information is represented by a QR code and
the predetermined pattern is a pattern of discrete dots corresponding to the QR code.

5. The image processing apparatus according to claim 1, connected with an external device that manages document data in association with information indicating authenticity of a document via a network, wherein
the processor executes the program to perform obtaining collation results by requesting the external device for collation between extracted embedded information and information indicating authenticity of the managed document and
in the generating, whether or not the copy-target printed material is an authentic document is confirmed by collation results received from the external device.

6. A control method of an image processing apparatus having a copy function, the control method comprising:
an obtaining step of obtaining a scanned image by scanning a copy-target printed material;
an extraction step of extracting embedded information from the scanned image by detecting a predetermined pattern from the scanned image;
a generation step of generating an image to be printed based on the scanned image; and
a printing step of performing print processing using the image to be printed, wherein
at the generation step, in a case where it is confirmed that the copy-target printed material is an authentic document by embedded information extracted at the extraction step, the image to be printed is generated by reinforcing a portion at which intensity has become low in the predetermined pattern detected from the scanned image.

7. A non-transitory computer readable storage medium storing a program for causing a computer to perform a control method of an image processing apparatus having a copy function, the control method comprising:
an obtaining step of obtaining a scanned image by scanning a copy-target printed material;
an extraction step of extracting embedded information from the scanned image by detecting a predetermined pattern from the scanned image;
a generation step of generating an image to be printed based on the scanned image; and
a printing step of performing print processing using the image to be printed, wherein
at the generation step, in a case where it is confirmed that the copy-target printed material is an authentic document by embedded information extracted at the extraction step, the image to be printed is generated by reinforcing a portion at which intensity has become low in the predetermined pattern detected from the scanned image.

8. An image processing apparatus having a copy function, the image processing apparatus comprising:
a memory that stores a program; and
a processor that executes the program to perform:
obtaining a scanned image by scanning a copy-target printed material;
extracting embedded information from the scanned image by detecting a predetermined pattern from the scanned image;
generating an image to be printed based on the scanned image; and
performing print processing using the image to be printed, wherein
in the generating, in a case where it is confirmed that the copy-target printed material is an authentic document by the extracted embedded information, the image to be printed is generated by removing the embedded information within the scanned image and embedding information indicating being an authentic document anew, and
wherein the removal of the embedded information is performed by applying a smoothing filer or an inverse filter obtained from the predetermined pattern to the scanned image.

9. The image processing apparatus according to claim 8, wherein
the embedded information is represented by binary data represented by a combination of 0 and 1 and
the predetermined pattern is a pattern indicating 0 or 1.

10. The image processing apparatus according to claim 8, wherein
the embedded information is represented by a QR code and
the predetermined pattern is a pattern of discrete dots corresponding to the QR code.

* * * * *